(12) United States Patent
Stutz et al.

(10) Patent No.: US 9,932,860 B2
(45) Date of Patent: Apr. 3, 2018

(54) OIL TRANSFER PASSAGE ARRANGEMENT FOR A SHAFT OF A GAS TURBINE ENGINE

(71) Applicant: United Technologies Corporation, Hartford, CT (US)

(72) Inventors: Robert C. Stutz, Dobbs Ferry, NY (US); Joseph Grillo, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 30 days.

(21) Appl. No.: 14/774,013

(22) PCT Filed: Mar. 12, 2014

(86) PCT No.: PCT/US2014/024533
§ 371 (c)(1),
(2) Date: Sep. 9, 2015

(87) PCT Pub. No.: WO2014/165138
PCT Pub. Date: Oct. 9, 2014

(65) Prior Publication Data
US 2016/0032769 A1     Feb. 4, 2016

Related U.S. Application Data

(60) Provisional application No. 61/779,430, filed on Mar. 13, 2013.

(51) Int. Cl.
*F01D 25/16* (2006.01)
*F01D 25/18* (2006.01)
(Continued)

(52) U.S. Cl.
CPC ........... *F01D 25/18* (2013.01); *F01D 25/125* (2013.01); *F01D 25/16* (2013.01); *F04D 29/053* (2013.01); *F04D 29/059* (2013.01); *F04D 29/063* (2013.01); *F16C 3/02* (2013.01); *F16N 7/363* (2013.01); *F05D 2220/32* (2013.01); *F05D 2240/50* (2013.01); *F05D 2240/61* (2013.01); *F05D 2260/232* (2013.01); *F05D 2260/98* (2013.01); *F16C 33/6677* (2013.01); *F16C 2360/23* (2013.01); *Y10T 464/10* (2015.01)

(58) Field of Classification Search
CPC ........ F01D 25/18; F01D 25/125; F01D 25/16; F04D 29/063; F04D 29/059; F04D 29/053; F05D 2260/232; F05D 2260/98; F05D 2240/61; F05D 2240/50; F05D 2220/32; F16C 3/02; F16C 33/6677; F16N 7/363; Y10T 464/10
USPC .............. 464/7, 17, 183; 384/475, 476, 900; 415/175; 184/6.11; 403/359.1, 359.5
See application file for complete search history.

(56) References Cited

U.S. PATENT DOCUMENTS

| | | |
|---|---|---|
| 4,040,249 A | 8/1977 | Kahle |
| 4,081,955 A | 4/1978 | Nikolaevich |

(Continued)

OTHER PUBLICATIONS

EP search report for EP14778668.5 dated May 19, 2016.

*Primary Examiner* — Gregory J Binda
(74) *Attorney, Agent, or Firm* — O'Shea Getz P.C.

(57) ABSTRACT

A shaft for a gas turbine engine includes a shaft bore along an axis, a circumferential groove within the shaft bore, a multiple of first axial grooves from said circumferential groove and a multiple of second axial grooves from said circumferential groove.

17 Claims, 3 Drawing Sheets

(51) Int. Cl.
  *F04D 29/053* (2006.01)
  *F04D 29/059* (2006.01)
  *F04D 29/063* (2006.01)
  *F16N 7/36* (2006.01)
  *F01D 25/12* (2006.01)
  *F16C 3/02* (2006.01)
  *F16C 33/66* (2006.01)

(56) References Cited

U.S. PATENT DOCUMENTS

| | | |
|---|---|---|
| 4,086,759 A | 5/1978 | Karstensen |
| 4,136,982 A * | 1/1979 | Sagady ............... F16B 21/18 403/359.5 X |
| 4,177,638 A | 12/1979 | Wood |
| 4,263,997 A | 4/1981 | Poore |
| 4,348,956 A * | 9/1982 | Schmidlin ............ F16B 7/0413 403/359.5 X |
| 4,475,869 A | 10/1984 | Davies |
| 5,119,905 A | 6/1992 | Murray |
| 5,694,765 A | 12/1997 | Hield |
| 5,749,660 A | 5/1998 | Dusserre-Telmon et al. |
| 6,045,266 A | 4/2000 | Mitsubori et al. |
| 6,409,464 B1 * | 6/2002 | Fisher ............... F01D 25/16 384/475 |
| 6,688,847 B2 | 2/2004 | Oya |
| 7,160,195 B2 * | 1/2007 | Lyon ................. F16D 3/06 464/183 X |
| 7,178,987 B2 | 2/2007 | Bridges et al. |
| 7,565,257 B2 | 7/2009 | Lee |
| 7,926,260 B2 | 4/2011 | Sheridan |
| 7,974,811 B2 | 7/2011 | Lee |
| 8,100,646 B2 | 1/2012 | Venter |
| 8,308,426 B2 | 11/2012 | Cigal et al. |
| 8,360,677 B2 * | 1/2013 | Yamashita ........... F16D 1/092 403/359.1 |
| 2006/0062504 A1 | 3/2006 | Wilton et al. |
| 2009/0294216 A1 | 12/2009 | Begin |

\* cited by examiner

OIL TRANSFER PASSAGE ARRANGEMENT FOR A SHAFT OF A GAS TURBINE ENGINE

This application is the National Stage of International Application No. PCT/US2014/024533 filed on Mar. 12, 2014, which claims benefit of U.S. Provisional Patent Appln. No. 61/779,430 filed Mar. 13, 2013.

BACKGROUND

The present disclosure relates to a gas turbine engine and, more particularly, to oil transfer arrangements therefor.

Gas turbine engines typically include gas compression and expansion sections that are spaced apart by a combustion section. An appropriate number of hollow coaxial shafts extend along the longitudinal axis of the engine to interconnect the compressor and turbine sections.

The shafts that interconnect the compressor and turbine sections are supported by bearings that are strategically positioned along the lengths thereof. The bearings carry radial and axial loads and are lubricated by a fluid lubricant, usually an appropriate oil. The lubricant flows between the various engine bearings and storage reservoirs through oil transfer passages located within and around the engine.

SUMMARY

A shaft for a gas turbine engine according to one disclosed non-limiting embodiment of the present disclosure includes a shaft bore along an axis, a circumferential groove within the shaft bore, a multiple of first axial grooves, and a multiple of second axial grooves from the circumferential groove.

In a further embodiment of the present disclosure, at least one of the multiple of first axial grooves includes an aperture.

In a further embodiment of any of the foregoing embodiments of the present disclosure, at least one of the multiple of first axial grooves includes an aperture that communicates with a passage toward a bearing.

In a further embodiment of any of the foregoing embodiments of the present disclosure, each of the multiple of first axial grooves includes an aperture.

In a further embodiment of any of the foregoing embodiments of the present disclosure, each of the multiple of first axial grooves includes an aperture that communicates with a passage toward a bearing.

In a further embodiment of any of the foregoing embodiments of the present disclosure, the multiple of second axial grooves extend axially beyond the multiple of first axial grooves.

In a further embodiment of any of the foregoing embodiments of the present disclosure, the device further comprises a multiple of apertures in a radial step that communicates with the shaft bore.

A further embodiment of any of the foregoing embodiments of the present disclosure includes an axial oil scoop that extends from the radial step.

A further embodiment of any of the foregoing embodiments of the present disclosure includes a multiple of inner splines within the shaft bore downstream of the multiple of second axial grooves.

A gas turbine engine according to another disclosed non-limiting embodiment of the present disclosure includes a shaft with a shaft bore along an axis, a circumferential groove within the shaft bore with a multiple of first axial grooves, and a multiple of second axial grooves from the circumferential groove. A multiple of splines are within the shaft bore downstream of the multiple of second axial grooves.

A further embodiment of any of the foregoing embodiments of the present disclosure includes a multiple of inner splines within the shaft bore downstream of the multiple of second axial grooves.

In a further embodiment of any of the foregoing embodiments of the present disclosure, each of the multiple of first axial grooves include an aperture that communicates with a passage toward a bearing.

In a further embodiment of any of the foregoing embodiments of the present disclosure, the multiple of second axial grooves extend axially beyond the multiple of first axial grooves.

A further embodiment of any of the foregoing embodiments of the present disclosure includes a multiple of apertures downstream of the multiple of splines.

In a further embodiment of any of the foregoing embodiments of the present disclosure, the multiple of apertures communicate with a respective radial passage through the shaft.

A method of cooling a bearing that supports a shaft according to another disclosed non-limiting embodiment of the present disclosure includes directing oil though a multiple of axial apertures toward a circumferential groove within a bore of the shaft; and distributing oil from the circumferential groove to a multiple of first axial grooves and a multiple of second axial grooves.

A further embodiment of any of the foregoing embodiments of the present disclosure includes terminating each of the multiple of first axial grooves at an aperture.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
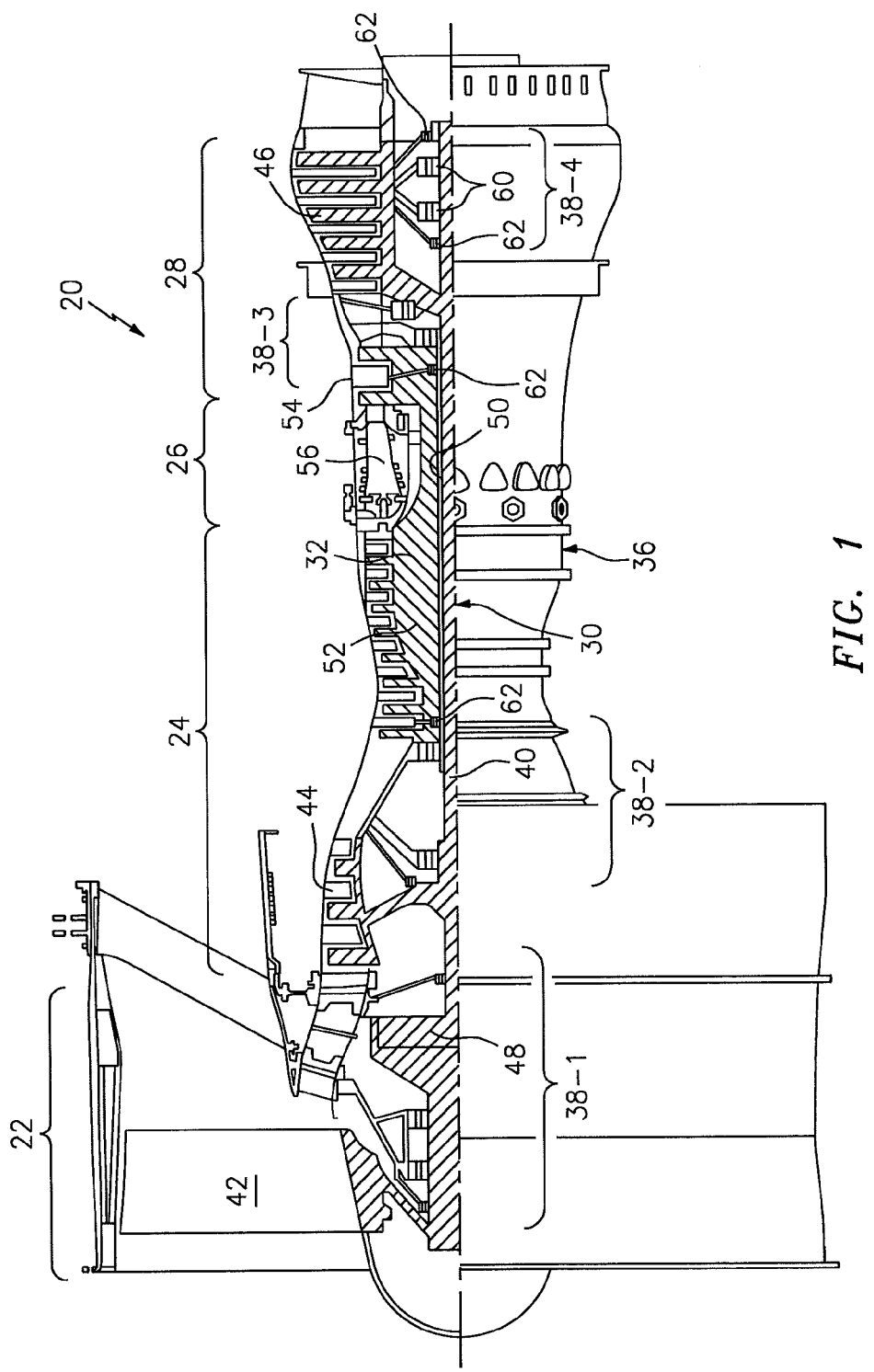
FIG. 1 is a schematic cross-section of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis "A" which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one example gas turbine engine 20 is less than about 1150 fps (351 m/s).

The bearing compartments 38-1, 38-2, 38-3, 38-4 in the disclosed non-limiting embodiment are defined herein as a front bearing compartment 38-1, a mid-bearing compartment 38-2 axially aft of the front bearing compartment 38-1, a mid-turbine bearing compartment 38-3 axially aft of the mid-bearing compartment 38-2 and a rear bearing compartment 38-4 axially aft of the mid-turbine bearing compartment 38-3.

Each of the bearing compartments 38-1, 38-2, 38-3, 38-4 includes one or more bearings 60 (illustrated schematically) and one or more—typically two (2)—seals 62 (illustrated schematically). Various types of bearings 60 and seals 62 may be used herewith. The bearings 60 and seals 62 respectively support and interface with the shafts 40, 50 of the respective low spool 30 and high spool 32.

The seals 62 operate to seal a "wet" zone from a "dry" zone. In other words, regions or volumes that contain oil may be referred to as a "wet" zone and an oil-free region may be referred to as a "dry" zone. So, for example, the interior of each bearing compartment 38-1, 38-2, 38-3, 38-4 may be referred to as a wet zone that ultimately communicates with an oil sump while the region external thereto may be referred to as a dry zone. That is, the bearings 60 support the low spool 30 and the high spool 32 and the carbon seals 62 separate the "wet" zone from the "dry" zone to define the boundaries of each bearing compartment 38-1, 38-2, 38-3, 38-4. Although particular bearing compartments and bearing arrangements are illustrated in the disclosed non-limiting embodiment, other bearing compartments and bearing arrangements in other engine architectures such as three-spool architectures will also benefit herefrom.

Figure 2:
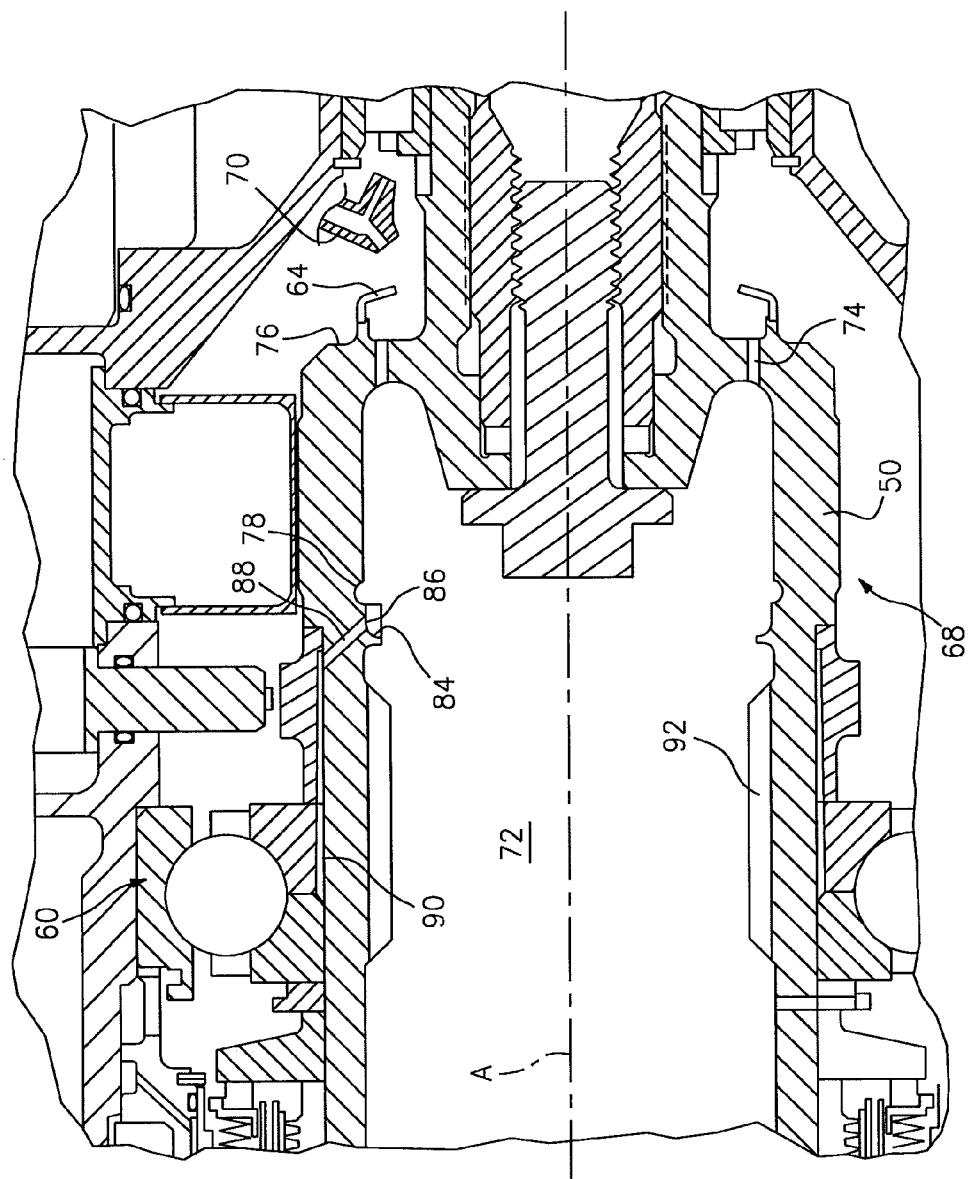
FIG. 2 is a longitudinal schematic sectional view of a gas turbine engine shaft.

With reference to FIG. 2, a lubrication passage system 68 receives oil under pressure to lubricate and cool the moving parts of the engine 20, such as the bearing 60. The lubrication passage system 68 receives oil from a nozzle 70 into a bore 72 of the outer shaft 50 through a multiple of apertures 74 in a radial step 76. That is, the oil enters essentially axially into the shaft 50. An axial oil scoop 64 that extends from the radial step 76 facilities oil flow into the apertures 74. It should be appreciated that although the low shaft 50 is illustrated in the disclosed non-limiting embodiment, various shafts and rotational components will benefit herefrom.

As the shaft 50 spins, oil is forced radially outward within the bore 72 that may be tapered and/or concave to facilitate transport of the oil—right to left in the Figure. The oil is communicated axially to a circumferential groove 78 (also shown in FIG. 3) in which the oil is transported around the bore 72. The groove 78 in FIG. 3 extends circumferentially at least one hundred and eighty degrees (180°) around the axis A.

Figure 3:
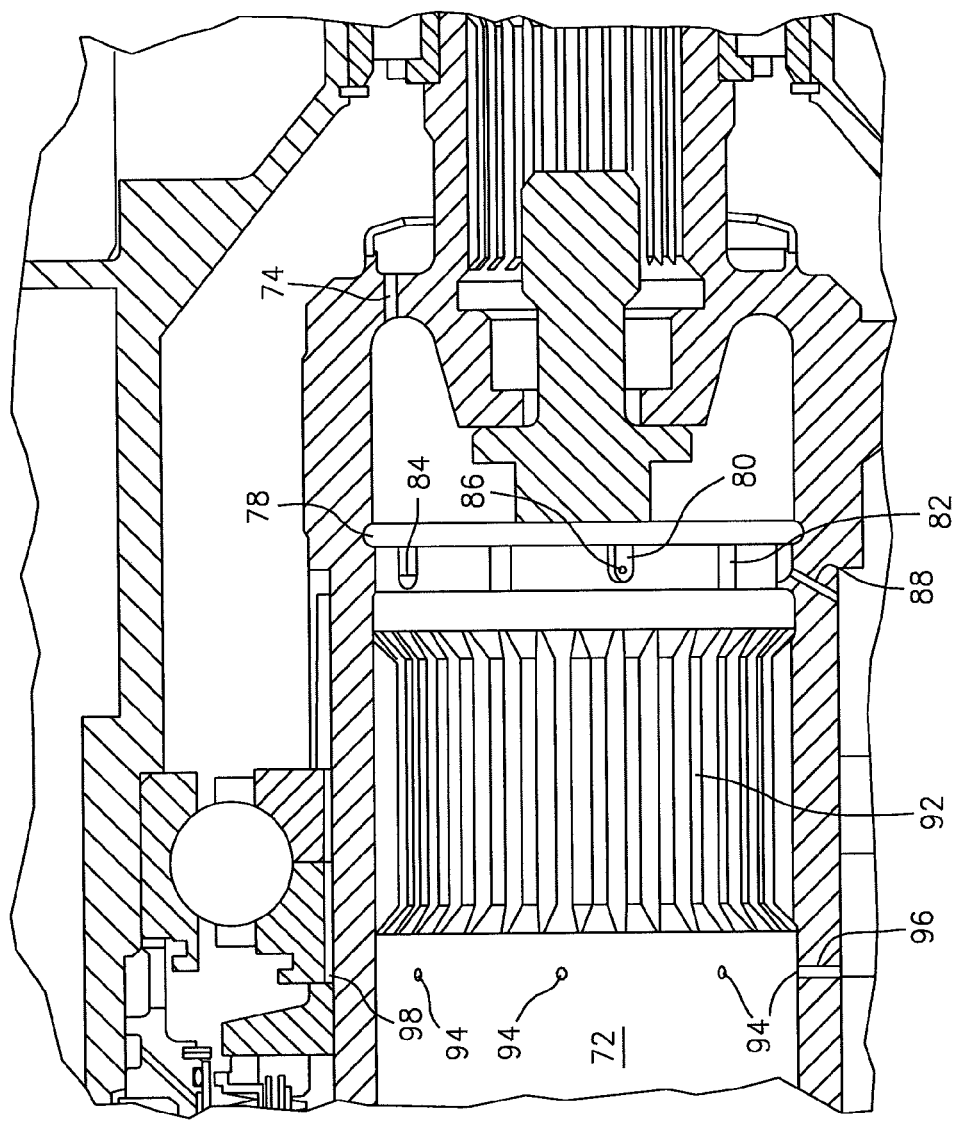
FIG. 3 is a longitudinal perspective partial sectional view of a gas turbine engine shaft.

From the circumferential groove 78, the oil is also axially transported into a multiple of first axial grooves 80 and a multiple of second axial grooves 82 which separate the oil into at least two destinations (also shown in FIG. 3). At least one (or each) of the multiple of first axial grooves 80 terminates at an end section 84 within which a respective aperture 86 feeds the oil the oil through a radial passage 88. The radial passage 88 may be angled (shown) or perpendicular to the engine axis A. The radial passage 88 communicates the oil to an axial bearing supply passage 90 that transports the oil to the bearing 60 and/or other component. In the embodiment of FIG. 3, the second axial grooves 82 extend axially beyond the first axial grooves 80.

From the circumferential groove 78, the oil is axially transported downstream into the multiple of second axial grooves 82 to a multiple of internal splines 92. In one disclosed non-limiting embodiment, the multiple of second axial grooves 82 may operate to transport the overflow of the oil from the multiple of first axial grooves 80. That is, the multiple of first axial grooves 80 and the multiple of second axial grooves 82 may be relatively sized such that a desired percentage of oil is provided to the at least two separate destinations.

The multiple of second axial grooves 82 transport the oil through, for example, a multiple of internal splines 92 to a multiple of apertures 94 (also shown in FIG. 3) that feeds the oil through a radial passage 96. The radial passage 96 may be perpendicular (shown) or angled with respect to the engine axis A. The radial passages 96 communicate the oil to transfer oil to another component or to an oil sump.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A shaft for a gas turbine engine comprising:
   a shaft bore along an axis;
   a circumferential groove within said shaft bore, wherein the circumferential groove extends continuously circumferentially at least 180 degrees around the axis;
   a multiple of first axial grooves extending in a first axial direction along the axis from said circumferential groove; and
   a multiple of second axial grooves extending in the first axial direction along the axis from said circumferential groove, wherein said multiple of second axial grooves extend axially beyond said multiple of first axial grooves.

2. The shaft as recited in claim 1, wherein at least one of said multiple of first axial grooves includes an aperture.

3. The shaft as recited in claim 1, wherein at least one of said multiple of first axial grooves includes an aperture that communicates with a passage toward a bearing.

4. The shaft as recited in claim 1, wherein each of said multiple of first axial grooves includes an aperture.

5. The shaft as recited in claim 1, wherein each of said multiple of first axial grooves includes an aperture that communicates with a passage toward a bearing.

6. The shaft as recited in claim 1, further comprising a multiple of apertures in a radial step that communicates with said shaft bore.

7. The shaft as recited in claim 6, further comprising an axial oil scoop that extends from said radial step.

8. The shaft as recited in claim 1, further comprising a multiple of inner splines within said shaft bore downstream of said multiple of second axial grooves and said multiple of first axial grooves.

9. A shaft for a gas turbine engine comprising:
   a shaft bore along an axis;
   a first groove within said shaft bore, wherein the first groove extends circumferentially and uninterrupted at least 180 degrees around the axis;
   a multiple of first axial grooves extending in a first axial direction along the axis from said first groove; and
   a multiple of second axial grooves extending in the first axial direction along the axis from said first groove, wherein said multiple of second axial grooves extend axially beyond said multiple of first axial grooves.

10. A gas turbine engine comprising:
    a shaft with a shaft bore along an axis;
    a circumferential groove within said shaft bore, wherein the circumferential groove extends circumferentially and uninterrupted at least one hundred and eighty degrees around the axis;
    a multiple of first axial grooves extending in a first axial direction along the axis from said circumferential groove;
    a multiple of second axial grooves extending in the first axial direction along the axis from said circumferential groove, wherein an axial length of each of said multiple of second axial grooves is greater than an axial length of each of said multiple of first axial grooves; and
    a multiple of splines within said shaft bore downstream of said multiple of second axial grooves.

11. The gas turbine engine as recited in claim 10, wherein each of said multiple of first axial grooves include an aperture that communicates with a passage toward a bearing.

12. The gas turbine engine as recited in claim 10, wherein said multiple of second axial grooves extend axially beyond said multiple of first axial grooves.

13. The gas turbine engine as recited in claim 10, further comprising a multiple of apertures downstream of said multiple of splines.

14. The gas turbine engine as recited in claim 13, wherein said multiple of apertures communicate with a respective radial passage through said shaft.

15. A method of cooling a bearing that supports a shaft comprising:
   directing oil though a multiple of axial apertures toward a circumferential groove within a bore of the shaft, wherein the circumferential groove extends circumferentially and uninterrupted at least 180 degrees around an axis of the shaft; and
   distributing oil from the circumferential groove to a multiple of first axial grooves and a multiple of second axial grooves.

16. The method as recited in claim 15, further comprising:
   terminating each of the multiple of first axial grooves at an aperture.

17. The method as recited in claim 15, wherein the multiple of first axial grooves extend in a first axial direction along an axis from said circumferential groove, wherein the multiple of second axial grooves extends in the first axial direction along the axis from said circumferential groove, and wherein said multiple of second axial grooves extend axially beyond said multiple of first axial grooves.

\* \* \* \* \*